W. T. Munger's IMPROVEMENT IN EXTENSION KNOBS.
Assignor to Thomas Kennedy
No. 71502
PATENTED NOV 26 1867
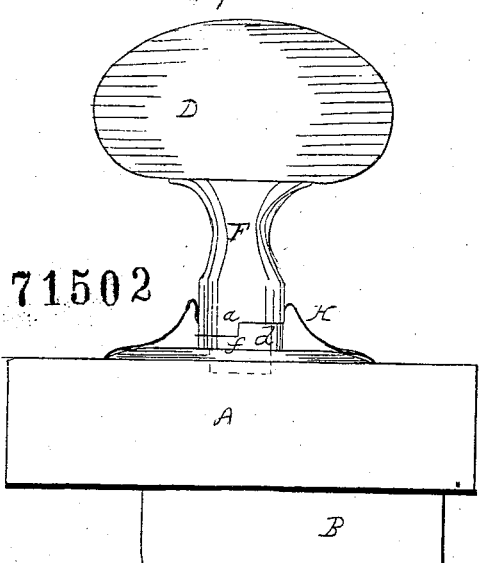
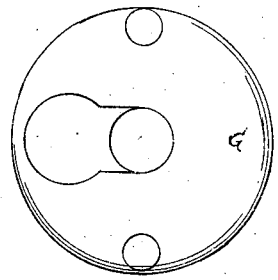
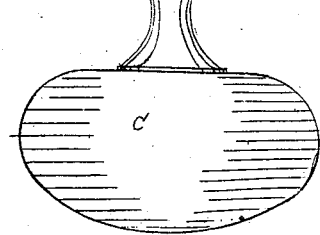
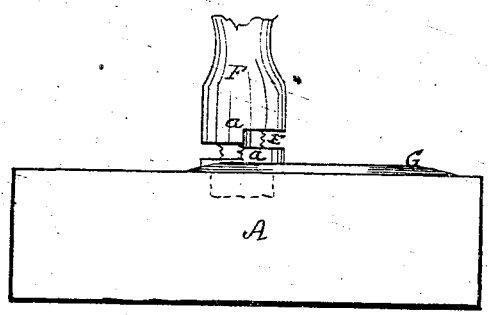
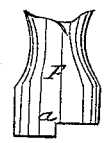
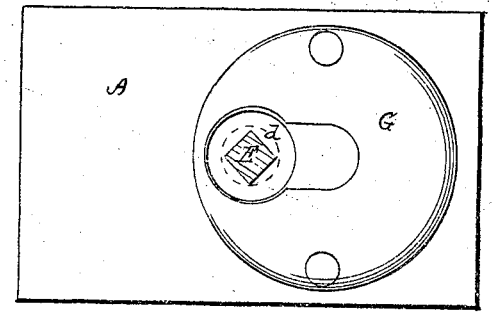
Witnesses
A. J. Tibbits
John H. Shumway
W. T. Munger
Inventor
By his Attorney

UNITED STATES PATENT OFFICE.

WALLACE T. MUNGER, OF BRANFORD, CONNECTICUT, ASSIGNOR TO THOMAS KENNEDY, OF SAME PLACE.

IMPROVEMENT IN ATTACHING KNOBS TO THE SPINDLES OF DOOR-LOCKS.

Specification forming part of Letters Patent No. 71,502, dated November 26, 1867.

*To all whom it may concern:*

Be it known that I, WALLACE T. MUNGER, of Branford, in the county of New Haven and State of Connecticut, have invented a new Improvement in Extension-Knobs for Doors; and I do hereby declare the following, when taken in connection with the accompanying drawings and the letters of reference marked thereon, to be a full, clear, and exact description of the same, and which said drawings constitute part of this specification, and represent, in—

Figure 1, the knob as attached to the door, the rose being shown in section; and in Figs. 2, 3, 4, 5, and 6 detached views to illustrate the construction and operation.

This invention relates to an improvement in the attachment of knobs to their spindles, whereby they may be nicely adjusted to any thickness of door; and to enable others to construct my improvement, I will proceed to describe the same as illustrated in the accompanying drawings.

A represents the door; B, the lock; C, the knob to which the spindle is firmly fixed, and D the other knob, the spindle E extending through and from knob to knob in the usual manner, fixed firmly to the knob C, and a thread cut upon the other end to fit into a corresponding thread in the neck F of the knob D. The neck F is formed with a shoulder, $a$, and over the spindle is placed a collar, $d$, having a corresponding shoulder, $f$, so that when the collar is set over the spindle, as seen in Figs. 2 and 6, the shoulder of the neck and the shoulder of the collar will fit together, as seen in Fig. 1. The said collar slips freely onto the spindle, and after the spindle has been inserted through the door and the collar $d$ placed thereon, a plate, G, is set over the collar having an opening eccentric to its own center for the purpose, as seen in Figs. 3 and 6, and from the said eccentric opening a slot is formed narrower than the diameter of the collar to the center of the said plate G, as seen in Figs. 3 and 6, so that when placed over the collar $d$, as seen in Figs. 2 and 6, and the collar raised, the said plate G may be slipped under the collar $d$ around the shank or smaller diameter $g$ of the collar, as seen in Fig. 1 and denoted in red, Fig. 3, the collar being seen in Fig. 5. After the collar $d$ and plate G have been placed in the position as denoted in Figs. 2 and 6, then screw the knob D onto the spindle, as near down to the collar as possible; then raise the collar so that its shoulder will lock onto the shoulder of the neck of the knob, as seen in Fig. 1; then slide the plate G under the collar, as seen in Fig. 1, to hold it in that position, and thus prevent the re-turning of the knob until the plate G shall have been removed, so as to permit the collar $d$ to be removed to unlock the shoulders. The plate G is covered by the rose H, as seen in Fig. 1, and the screws through the rose serve to hold the plate G.

By this construction and arrangement the objection to the common security by a screw is entirely overcome, and the knob is secured in the most perfect manner and easily adjusted without the intervention of the inconvenient washers generally used.

Having thus fully described my invention, what I claim as new and useful, and desire to secure by Letters Patent, is—

The combination of the collar $d$ with the neck F of the knob, provided each with corresponding shoulders, arranged and combined with the plate G so as to operate to secure the knob, substantially in the manner as herein set forth.

WALLACE T. MUNGER.

Witnesses:
   J. R. WASSON,
   J. H. BABCOCK.